US008838872B2

(12) United States Patent
Starr (10) Patent No.: US 8,838,872 B2
(45) Date of Patent: Sep. 16, 2014

(54) SYSTEMS FOR AND METHODS OF IMPROVING THE EFFICIENCY OF AUTOMATED DATA STORAGE LIBRARIES

(75) Inventor: Matthew Thomas Starr, Lafayette, CO (US)

(73) Assignee: Spectra Logic, Corporation, Boulder, CO (US)

( * ) Notice: Subject to any disclaimer, the term of this patent is extended or adjusted under 35 U.S.C. 154(b) by 260 days.

(21) Appl. No.: 13/354,169

(22) Filed: Jan. 19, 2012

(65) Prior Publication Data

US 2013/0191588 A1 Jul. 25, 2013

(51) Int. Cl.
*G06F 12/00* (2006.01)

(52) U.S. Cl.
USPC ............................................................ 711/4

(58) Field of Classification Search
None
See application file for complete search history.

(56) References Cited

U.S. PATENT DOCUMENTS

| | | | |
|---|---|---|---|
| 4,932,826 A | 6/1990 | Moy et al. | |
| 5,479,581 A | 12/1995 | Kleinschnitz | |
| 5,700,125 A | 12/1997 | Falace et al. | |
| 5,836,735 A | 11/1998 | Yeakley et al. | |
| 6,011,669 A | 1/2000 | Apple et al. | |
| 6,059,509 A | 5/2000 | Ostwald | |
| 6,068,436 A | 5/2000 | Black et al. | |
| 6,494,663 B2 * | 12/2002 | Ostwald et al. | 414/281 |
| 6,550,391 B1 | 4/2003 | Ostwald et al. | |
| 6,574,173 B1 | 6/2003 | Manes | |
| 6,889,232 B2 * | 5/2005 | Pudipeddi et al. | 1/1 |
| 7,974,040 B2 | 7/2011 | Green et al. | |
| 8,260,744 B1 * | 9/2012 | Chatterjee et al. | 707/639 |
| 8,458,422 B1 * | 6/2013 | Holdman et al. | 711/162 |
| 2004/0225834 A1 * | 11/2004 | Lu et al. | 711/114 |
| 2007/0204123 A1 * | 8/2007 | Saliba | 711/165 |

OTHER PUBLICATIONS

Spctra Logic, T-Finity brocure, Sep. 2010.

* cited by examiner

*Primary Examiner* — Brian Peugh
(74) *Attorney, Agent, or Firm* — Kenneth Altshuler (57) ABSTRACT

Described are systems for and methods of improving the efficiency of an automated data storage library.

30 Claims, 7 Drawing Sheets

FIG. 7

SYSTEMS FOR AND METHODS OF IMPROVING THE EFFICIENCY OF AUTOMATED DATA STORAGE LIBRARIES

CROSS-REFERENCE TO RELATED APPLICATIONS

None.

BACKGROUND OF THE INVENTION

1. Field of the Invention

The present invention relates to data storage libraries that house a plurality of data storage tape cartridges such as magnetic tape cartridges. Such libraries include drives for reading data from the tape cartridges or writing data onto the tape cartridges and further include a so-called robotic transporter to move the tape cartridges between tape cartridge storage locations and the drive or between storage locations. The present invention generally relates to systems for and methods of improving the efficiency of a data storage library system.

2. Description of Related Art

The speed with which an automated data storage library performs its operations is an extremely important factor in connection with assessing the desirability and the commercial value of a library. With increased speed of library operations, fewer libraries are needed, or fewer library components, such as robots and drives, are needed.

Commands from a host computer to move tape cartridges to perform read/write operations, and the like, are virtually instantaneous, but may be queued or backlogged if the library robot and drives are not capable of implementing the commands as soon as the host computer issues the commands. Thus, the speed with which a robot moves to grasp a tape cartridge from a storage location and transfers the tape cartridge to a drive, the speed with which the drive performs the read/write operations, and the speed with which the robot obtains the tape cartridge from the drive and return the tape cartridge to the storage location, as well as the speed with which a robot transfers a tape cartridge from one storage location to another storage location, are all important factors in the overall speed and efficiency of library operations. Ideally, the library will work with such speed and efficiency that there will never be any queue or backlog of commands from the host computer—an achievement that is very difficult to attain.

It is to innovations in view of this background and with the goal of improving the efficiency of operations of an automated data storage library, that the present invention is directed.

SUMMARY OF THE INVENTION

The present invention relates to systems for and methods of improving the efficiency of an automated data storage library.

BRIEF DESCRIPTION OF THE DRAWINGS

The present invention will be described with reference to the accompanying drawings, wherein.

DETAILED DESCRIPTION OF SEVERAL EMBODIMENTS

Preferred embodiments of the present invention will now be described with reference to the accompanying drawings, wherein like reference numerals refer to the same item. The terminology used in the description presented herein is intended to be interpreted in its broadest manner, even though it is being utilized in conjunction with a detailed description of certain specific preferred embodiments of the present invention. It is further emphasized that the following description relates to certain preferred embodiments and that the invention is directed to and applies to other embodiments that may not be specifically described below.

Figure 1:
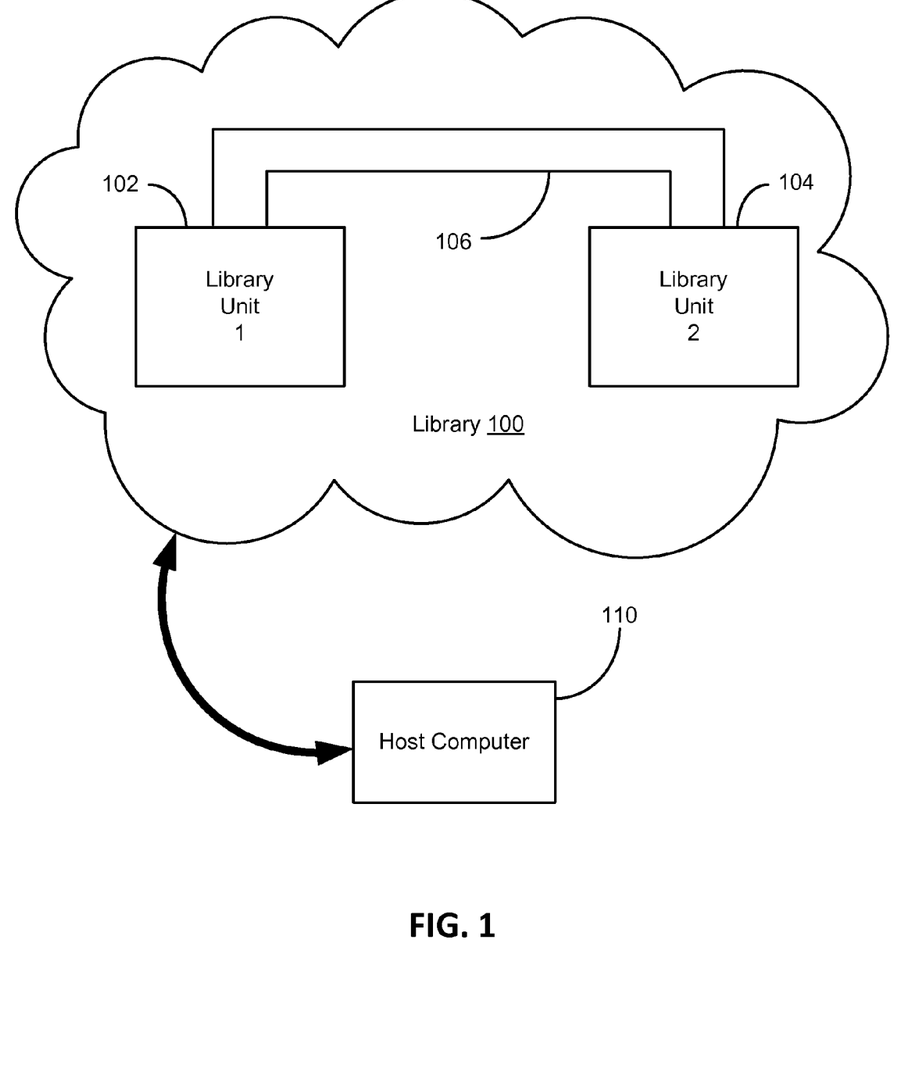
FIG. 1 is a schematic diagram of an automated data storage library system including two sub-libraries consistent with embodiments of the present invention.

Referring to the drawings in general, and more specifically to FIG. 1, shown therein is an illustration of a data storage arrangement constructed in accordance with various embodiments of the present invention. In what follows, similar or identical structures may be identified using identical callouts.

The data storage arrangement 100 illustrated in FIG. 1 can comprise a first sub-library 102 and a second sub-library 104 that are connected via a mobile storage element transport bridge 106. The data storage arrangement 100 is adapted and arranged to communicate with one or more host computers 110, such as an Independent Software Vendor (ISV) that can be made to perceive the data storage arrangement 100 as a single library. A commercial example of an ISV is Veritas ISV, produced by Semantec Corporation of Mountain View, Calif. The storage element transport bridge 106 is adapted and arranged to transport mobile storage elements, such as tape cartridges, from the first sub-library 102 to the second sub-library 104.

Figure 2:
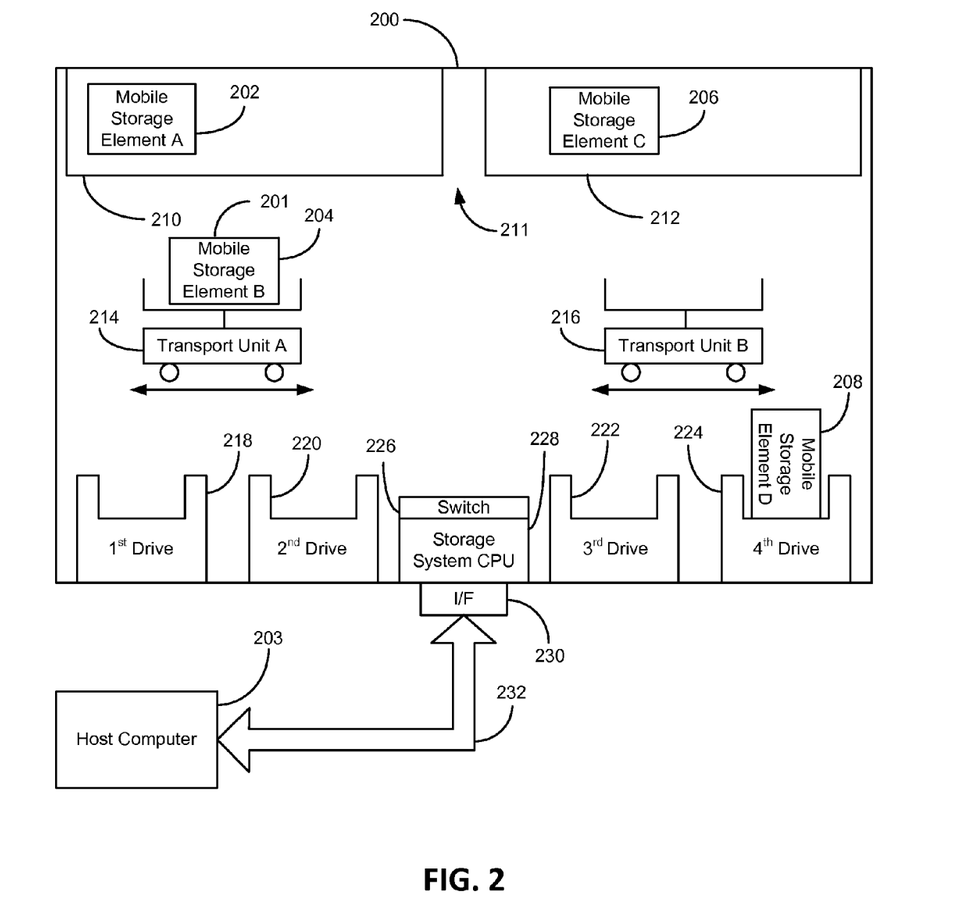
FIG. 2 is a schematic diagram of an automated data storage library depicting several of the significant components and features thereof.

FIG. 2 shows a more detailed diagram of a data storage sub-library unit 200 with which embodiments of the present invention may be employed. Embodiments of the present invention may be employed with other sub-library unit embodiments also, and the arrangement of the sub-library units shown in FIG. 1 and FIG. 2 should be considered as only one example of a data storage arrangement in which embodiments of the present invention may be employed.

The sub-library 200 is depicted in communication with a host computer 203 via path 232 by way of a primary communication interface processor device (UF) 230 that includes a host port (not shown). In the present example, the data storage library unit 200 can be arranged to function as a storage library system that can take in and send out data to a user of data. The host computer 203 is one exemplary embodiment of a consumer of data; other embodiments can also include a second storage system, similar to data storage library unit 200, or a streaming output device such as a video server, just to name some examples. A consumer of data transmits data or receives data for storage elsewhere, i.e., a consumer of data is generally capable of "taking in" and/or "sending out" data.

For example, a host computer 203 is a consumer of data when receiving data (or sending data, such as to the data storage library unit 200), and a data storage library unit 200 is a consumer of data when receiving data and/or sending data to another entity wherein the data is stored. The host computer 203 can be a personal computer, a main frame computer, a server, or any computer system capable of communication with the data storage library unit 200, just to name a few examples. The communication path 232 facilitates communication between the host computer 203 and the data storage library unit 200. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 232 can be in the form of a wire line pathway, wireless, or a combination thereof, for example.

The data storage library unit 200, which may also be considered a data storage library by those skilled in the art, is illustratively shown as generally including a shelf system 211, a first robotic transport unit 214 and a second robotic transport unit 216, four removable storage elements 202, 204, 206 and 208, four drives 218, 220, 222 and 224, a switch system 226, a storage system Central Processing Unit (CPU) 228, which employs a macroprocessor as part of the CPU computing device 228, and an OF 230. As one skilled in the art will recognize, the block diagram of the data storage library unit 200 shows for purposes of simplicity only the primary elements of the exemplary data storage arrangement, and certain necessary structures and components for the aforementioned elements to properly function have been omitted. For example, in practice, the data storage library unit 200 includes all of the necessary wiring, user interface panels, plugs, modular components, entry and exit port(s) to introduce (or remove) removable storage elements into the data storage library unit 200, fault protectors, uninterruptable power supplies, processors, busses, robotic transport unit tracks, indication lights, and so on, in order to function as a data storage library.

In the illustrative arrangement shown in FIG. 2, the shelf system 211 possesses a first shelf 210 and a second shelf 212 each adapted to support the removable storage elements A 202, B 204, C 206, and D 208. The shelf system 211 can possess a single shelf or multiple shelf columns and levels. The shelf system 211 can be located along one side of the data storage library unit 200, as illustratively shown, or optionally in different locations, such as along opposing walls, for example. Furthermore, the shelf system 211 can provide more tailored, accommodating locations adapted specifically to one or more removable storage elements, such as a slot or indentation that matches a removable storage element's footprint. The removable storage element is a storage element that has been adapted for repetitive mobility by a robotic transport unit. The removable storage element can be a disk drive adapted for mobility, a disk drive magazine adapted for mobility, wherein the disk drive magazine comprises a plurality of disk drives, a solid state memory device adapted for mobility, such as a flash memory device, a solid state drive adapted for mobility, a tape cartridge, or a tape magazine comprising a plurality of tape cartridges, for example. Further, the removable, or portable, storage elements are removable from the data storage library system 200. For example, a tape cartridge, or other mobile storage element, is a removable storage element that can be stored in a location external to the data storage library unit storage system 200, such as in a vault. Hence, a removable storage element, also called a mobile storage element or a tape cartridge element herein, is a storage element that is intended to be and capable of being moved and engaged with a drive cyclically and frequently. Moreover, the mobile data storage elements described herein are arranged and adapted to function within the library environment described. Hence, generally speaking, elements disposed in a personal computer or mainframe system, though removable with from the system, are not arranged and adapted to operate within the storage library environment described herein. The drive, which is a data storage transfer device, is adapted to receive and substantially support a removable storage element via an opening in the drive such that, when cooperatively linked, a read and/or write relationship is formed (i.e., data storage operations are facilitated between the drive and the removable storage medium).

The data storage library unit storage system 200 illustratively shows four drives 218, 220, 222 and 224, however, in optional embodiments, the library may possess more drives or fewer drives. A drive is a data transfer device that is adapted and arranged to form a cooperating relationship with a removable storage element such that data can be written to and/or read from the removable storage element. Examples of various drives include a tape drive that is adapted to receive tape cartridges, a docking station which receives magnetic hard disk drives, or solid state drives, adapted for mobility that when paired forms a cooperating read and write relationship. Some examples of magnetic hard disk drives and solid state drives adapted for mobility are those which are essentially inside an exterior casing with electrical contacts designed for high cycle contacting. Docking stations may further be arranged to cooperate with multiple hard disk drives or multiple solid state drives (or some combination thereof) that are essentially inside of an exterior casing with electrical contacts designed for high physical cycle connections.

With continued reference to FIG. 2, the data storage library unit storage system 200 possesses a first robotic transport unit 214 and a second robotic transport unit 216 wherein the first robotic transport unit 214 is depicted transporting magazine B 204 between a drive 218 and the shelf system 212, and a second robotic transport unit 216 that is available for transporting a removable storage element 201. The term "robot" may be used herein to abbreviate the term "robotic transport unit" or "robot transporter" without departing from the scope and spirit of the present invention. It should be appreciated that one or any other number of robots may be included in the arrangement 200. In the exemplary illustrated arrangement 200, the robots 214, 216 are adapted to move between the first shelf 210 and the second shelf 212 and all of the drives 218, 220, 222 and 224. Though the robots 214, 216 are illustratively shown as block diagrams, an example of a robotic transport unit is that utilized in a commercial storage system such as a T-950 library or a T-Finity library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps removable storage elements from a shelf system or from a drive to be moved via the associated robotic transport unit. The integrated picker system further is capable of disposing a removable storage element to the shelf system or to a drive. In the illustrative arrangement, the robots 214, 216 merely provide transportation of the removable storage elements between the shelf system 211 and a drive 218, 220, 222, and 224. The robot may provide the added feature of depositing a removable storage element on the shelf system 211 and/or loading the removable storage element in a cooperating relationship with a drive such that data can be read to and/or written from the removable storage element via the drive. In optional configurations, a loading feature can reside with each drive instead of a picker unit integrated with a robotic transport unit.

It will be appreciated by those skilled in the art that the robots 214, 216 can be designed to travel along the same tracks or rails within the library. It is also possible to add additional cabinets containing additional shelf systems 211 so that the rails or tracks are extended in a common library unit 200. Typically, in order to conserve space in which the library situated, the robots 214, 216 travel through a tunnel, corridor, or hallway bounded by the shelf system 211, the drives 218, 220, 222, 224, or the walls of the library. Also, typically, the library includes a ceiling so as to inhibit dust and other debris from entering the library, to confine sound and noise generated by library operation, and otherwise to ameliorate library operations.

Figure 3:
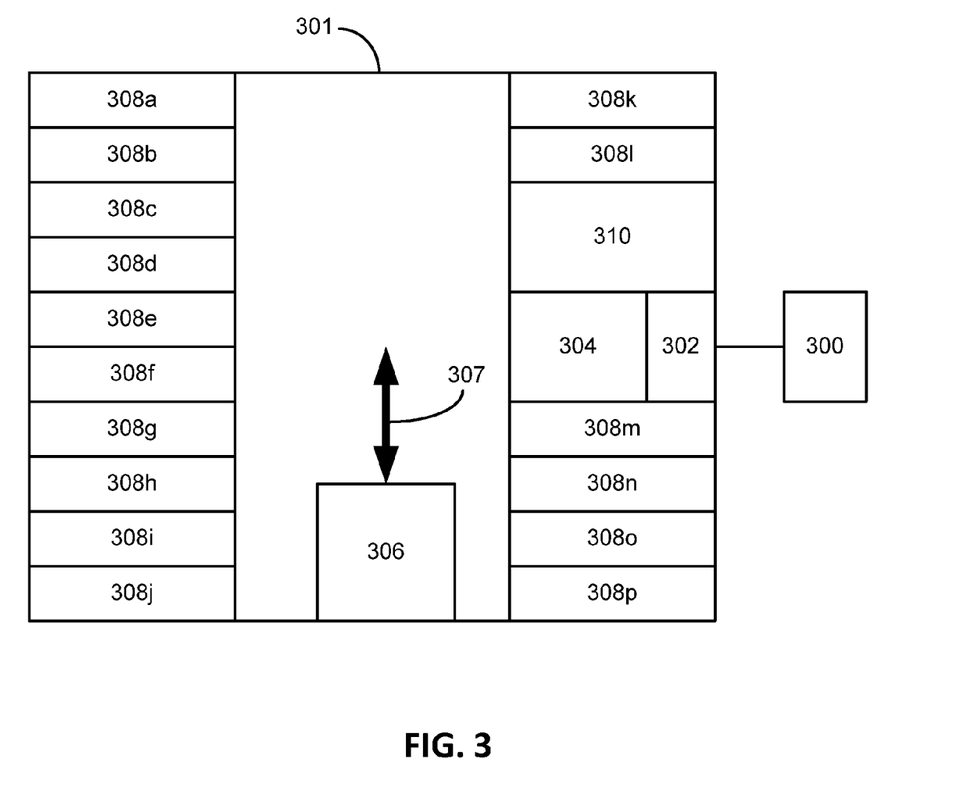
FIG. 3 is a schematic diagram of an automated data storage library according to certain embodiments of the present invention.

FIG. 3 shows a schematic diagram of an automated data storage sub-library 301 (which can essentially resemble the sub-library 200) in accordance with certain embodiments of the present invention. The sub-library 301 can, in certain embodiments, include a plurality of cabinets that essentially comprise a contiguous multi-framed unit that may share a common robotic corridor within the multi-framed unit. The sub-library 301 is communicatively linked with a host computer 300, which may be operated with software provided by an ISV, for example. The host computer 300 is operatively connected to a library controller 302, which in turn is operatively connected to a drive 304 and a moveable robot 306. The robot 306 generally translates in the directions of by-directional arrow 307. The sub-library 301 also includes several storage locations 308a-308p that are adapted to accommodate data storage elements, such as data cartridges or magazines, for example. In the depicted embodiment of FIG. 3, the storage locations 308a-308p are generally arranged into spaced, opposing rows. It will be appreciated by those skilled in the art that the storage locations 308a-308p may be arranged in different configurations and that the library controller 302 and the drive 304 may be disposed in different locations within the sub-library 301. Also, the robot 306 may travel in a variety of directions. The sub-library 301 depicted in FIG. 3 also includes a preferably stationary, fixed holding zone or receptacle 310, which is preferably disposed adjacent to the drive 304, but which may be disposed at other locations within the sub-library 301. The holding receptacle 310 may comprise a preferably immovable, dedicated shelf, chamber, or other receptacle.

In a simple library operation, an operator utilizing the host computer 300 may provide an instruction to read information maintained by a target tape cartridge located in storage location 308a, for example. In such an event, the library controller 302 will essentially instruct the robot 306 to move to a position adjacent to the storage location 308a, and use its picker system to grasp the target tape cartridge from the storage location 308a. Once grasped, the target tape cartridge is moved to a position adjacent to a drive 304, whereupon the picker then inserts the target tape cartridge into the drive 304. Once loaded in the drive 304, storage operations, such as reading and writing data to and from the target tape cartridge can be preformed. The information read by the drive 304 is transmitted to the host computer 300 for viewing, copying, and the like by an operator of the host computer 300, for example.

In a simple, inefficient prior art process, the robot 306 may remain positioned adjacent to the drive 304 until the write/read operation is completed by the drive 304, whereupon the robot 306 will utilize its picker to retrieve the tape cartridge from the drive 304 and then move to a position adjacent to the storage location 308a, and then utilize its picker to reinsert the tape cartridge back into the storage location 308a. It will be appreciated that if the host computer 300 issues another command to perform a read/write operation on a different tape cartridge when the robot 306 and the drive 304 are "busy" or occupied with existing tasks, the command must be rejected or queued in a backlog. So, for example, if the robot 306 is waiting adjacent to the drive 304 for the tape cartridge to be written/read and a command from the host computer 300 instructs the robot 306 to get a tape cartridge disposed in storage location 308j, the robot 306 must first wait until the drive 304 finishes writing/reading the tape cartridge therein, then transfer that tape cartridge to the storage location 308a, then travel to a position adjacent to the storage location 308j and obtain the tape cartridge therein, and then move to a position adjacent to the drive 304 and insert the tape cartridge into the drive 304.

In accordance with one embodiment of the present invention, the library 301 includes a holding receptacle 310, which again, is preferably located adjacent to the drive 304. The holding receptacle 310 is preferably adapted to receive one or more tape cartridges for temporary disposition therein. With such a holding receptacle 310, the robot 306, instead of waiting adjacent to the drive 304 until the drive 304 finishes its write/read operation, will instead move adjacent to storage location 308j, obtain the tape cartridge therein, move adjacent to the holding receptacle 310, and insert the tape cartridge into the holding receptacle 310 for temporary disposition therein. Thus, it will be appreciated in connection with the foregoing example, that instead of the robot 306 traveling from the drive 304 with the tape cartridge back to the storage location 308a, then all the way down to the storage location 308j, and then back up to the drive 304, the robot 306 needs only to move a much shorter distance from the drive 304, to the storage location 308a, then to the holding receptacle 310, and then to the drive 304. It will be appreciated by those skilled in the art that the data access speed of the library 301 is thereby enhanced by shortening the time of travel of the robot 306 to perform the exact same function. Although the current description describes the travel in terms of physical distance, it will also be appreciated by those skilled in the art that ideally the "distance" to be measured is in terms of time of travel of the robot 306.

The library 301 may be made even more efficient by having the robot 306 take the tape cartridge upon completion of the write/read operation from the drive 304 and deposit the tape cartridge in the holding receptacle 310, then take the tape cartridge from the holding receptacle 310 that was formerly in the storage location 308j, and then move to position adjacent to the drive 304 and then insert the tape cartridge into the drive for read/write operations. While the read/write operations on the tape cartridge that was in storage location 308j are being conducted by drive 304, the robot 306 then, instead of being positioned stationary, adjacent to the drive 304, may move to a position adjacent to the holding receptacle 310, obtain the tape cartridge temporarily disposed therein, and then move to a position adjacent to the storage location 308a and place the tape cartridge therein.

Thus, the holding receptacle 310 serves as a place for the temporary disposition of tape cartridges being moved either from a storage location to the drive 304 or from the drive 304 to a storage location, or both, or for other transfers within the library, such as from one storage location to another storage location.

In accordance with the foregoing embodiment of the present invention, the holding receptacle 310 may be a "virtual" feature. That is, the library controller 302 may "know" where the tape cartridge is physically disposed within the library 301 at all times, but the host computer 300 sees only that the movement of the tape cartridge to its ultimate destination is "complete", even though in physical reality, the tape cartridge may be temporarily disposed in the holding receptacle 310.

Embodiments of the current invention also contemplate that the holding receptacle 310 may be utilized for temporary disposition of a tape cartridge only when a command from the host computer 300 is queued or backlogged. Certain embodiments further contemplate that the holding receptacle 310 may be utilized only for tape cartridges stored in or to be delivered to storage locations that are relatively far away from the drive 304 or at least farther away from the drive 304 than the holding receptacle 310. For example, transfers of tape cartridges from or to the storage locations 308*d*, 308*e*, 308*f*, 308*g*, 308*l*, and 308*m* might not be directed for temporary disposition within the holding receptacle 310, but tape cartridges in the other storage locations may be predetermined as being appropriate for utilization of the holding receptacle 310.

In a sense, the holding receptacle 310 may be utilized for temporary disposition of a tape cartridges in between its travel from one location to another location in the automated data storage library 301, such as to its ultimate destination.

In yet another embodiment of the present invention, the storage locations 308*a*-308*p* are each given a priority ranking that is preferably based on their physical distance relative to the drive 304, but in another related aspect, may be based on the relative time of travel of the robot 306 between each storage location 308 and the drive 304. With reference to FIG. 3, the priority may be as follows: the storage location 308*m* has the highest priority ranking; the storage locations 308*e* and 308*f* have the next highest priority ranking; the storage locations 308*n*, 308*d*, and 308*g* each have the next highest priority ranking; . . . and storage locations 308*a* and 308*j* each have the lowest priority ranking. The priority ranking of the storage locations may be used to determine how tape cartridges are preferably disposed within the library 301 and within certain ones of the storage locations. The host computer 300 or the library controller 302, or both, may be programmed with an association between the tape cartridge and the priority rankings of the various storage locations. For example, if the library 301 includes only six tape cartridges, then several of the storage locations will be empty, and the program may decide in which six selected storage locations the tape cartridges should be disposed. The selection process is preferably correlated with the priority rankings of the storage locations, so that, for example, the six tape cartridges would be disposed in storage locations 308*m*, 308*e*, 308*f*, 308*n*, 308*d*, and 308*g*. Thus, it will be appreciated that by placing the tape cartridges in the storage locations that are relatively closest, either by physical distance or by time of travel of the robot 306 to the drive 304, the travel of the robot 306 will be minimized, thereby enhancing library operations.

A tape cartridge may also have its own priority rankings based upon either the total amount of information contained therein, the relative age of the information contained therein, the relative length of time the tape cartridge has been in the library 301, or on the historical frequency of use of the tape cartridge, such as the frequency with which the tape cartridge has been operationally coupled with the drive 304. Where the tape cartridge priority ranking is based on the amount of information in the tape cartridge, there is usually a presumption that the tape cartridge with the most information therein is most often used in the library 301. Therefore, the tape cartridges containing the most information therein would be placed in those storage locations relatively closest to the drive 304, and those tape cartridges containing relatively the least information would be disposed in the storage locations located relatively farthest from the drive 304. Likewise, where tape cartridge priority is based on the relative age of the information contained therein, there is usually a presumption that the tape cartridge with the most recent information therein is most often used in the library 301. Therefore, the tape cartridges containing the most recent information therein would be placed in those storage locations relatively closest to the drive 304, and those tape cartridges containing the relatively oldest information would be disposed in the storage locations located relatively farthest from the drive 304. Likewise, instead of the relative age of the information contained in each tape, the tape cartridge priority may be based on the relative age or date when a tape cartridge was first inserted in the library 301 or the duration of the tape cartridge in the library 301, with a presumption that the relatively most recently inserted tape cartridges are most often used and therefore disposed in storage locations relatively closest to the drive 304. A perhaps better, more efficient, allocation of tape cartridges into selected storage locations is based on the historical frequency of use of the tape cartridges, with those tape cartridges having the highest historical frequency of use being placed closest to the drive 304, and those with the lowest historical frequency of use being placed in the storage locations relatively farthest from the drive 304. The historical frequency use of the tape cartridges may be calculated over a predetermined time interval such as the tape cartridge use in the preceding three weeks or six months, for example. Also, a library operator may selectively vary the length of the time interval. In either of the foregoing embodiments, the library controller 302 may contain or may be operationally connected to a memory in which the amount of information on each tape cartridge is maintained and updated, the relative age of the information contained in each tape cartridge is maintained and updated, the relative age or date of insertion of each tape cartridge in the library is maintained and updated, and the historical frequency of use of each tape cartridge is also maintained and updated.

As information is written onto or deleted from a particular tape cartridge, as a tape cartridge is inserted in or taken out of the library 301, or as a particular tape cartridge is used, the priority ranking of such tape cartridges may change relative to other tape cartridges. Such data is preferably maintained and updated in the memory associated with the library controller 302. When one tape cartridge no longer has the same priority ranking relative to other tape cartridges for the storage location in which it is disposed, then the library 301 may automatically issue a command to rearrange the tape cartridge in the storage locations within the library 301 so that the tape cartridges having the highest priority ranking are stored relatively nearest the drive 304 and those with the lowest priority ranking are stored relatively farthest from the drive 304. The command may automatically issue upon discrepancies having a certain predetermined threshold, or the controller 302 may issue an alert such as to the host computer 300 notifying an operator that such a discrepancy exists and inquiring as to whether the operator wishes to issue a command to rearrange the tape cartridges within the library 301 to accommodate or match the preferred, desired association of tape cartridge priority rankings with the priority rankings of the storage locations. Though the aforementioned embodiments are exemplified by individual tape cartridges, tape cartridge magazines can likewise be substituted therewith in the scope and spirit of the present invention.

Figure 4:
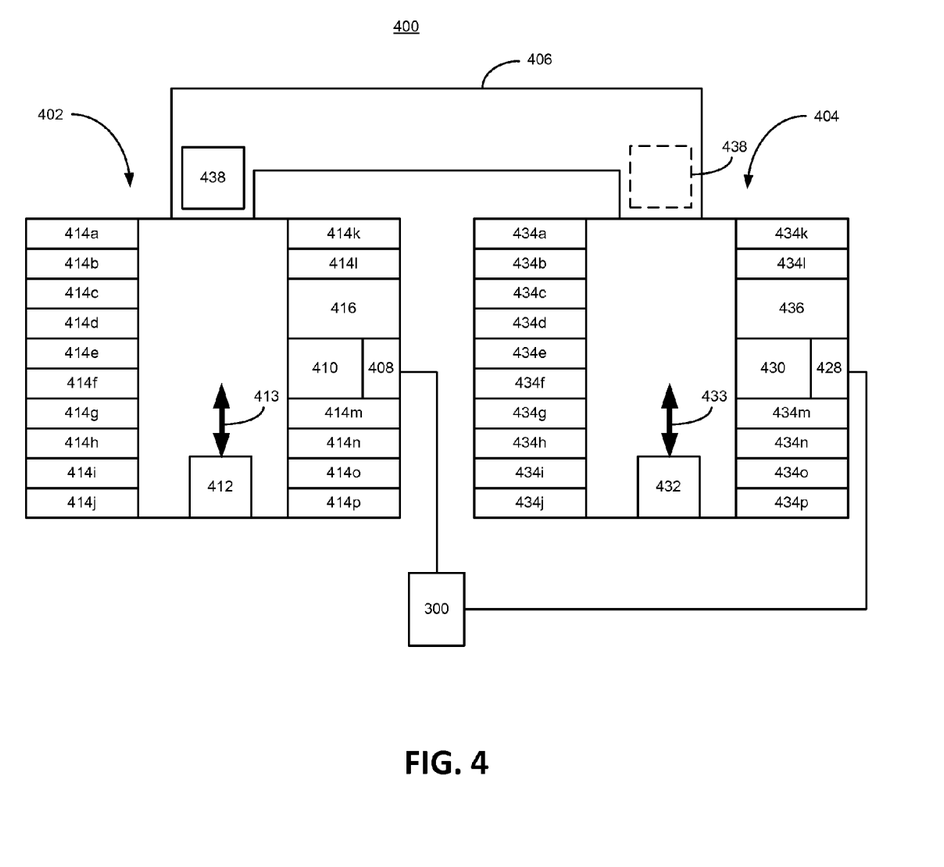
FIG. 4 is a schematic diagram of an automated data storage library consistent with certain embodiments of the present invention.

FIG. 4 is a schematic diagram of yet another library system 400 in accordance with an embodiment of the present invention. The library system 400 shown in FIG. 4 includes two sub-libraries 402, 404 that are preferably in all respects similar to the library 301 shown in FIG. 3, except that a single host computer 300 is operatively connected to a controller 408 and a controller 428 in each one of these sub-libraries 402, 404, respectively. Each of the sub-libraries 402, 404 includes a library controller 408, 428, a drive 410, 430, a robot 412, 432 moveable in the directions of bi-directional arrows 413, 433, and a plurality of storage locations 414a-414p, 434a-434p, respectively. In the embodiment shown in FIG. 4, holding receptacles 416, 436 are shown, however, it will be appreciated by those skilled in the art that such holding receptacles 416, 436 may be included in one, both, or neither of the sub-libraries 402, 404 in this embodiment.

The present embodiment of FIG. 4 is described by way of a tape library system, however, one skilled in the art will appreciate that a tape cartridge can be substituted with an alternative form of mobile data storage element suited for the library system 400 within the spirit and scope of the present invention, such as a solid state drive adapted for mobility to operatively function in the library system 400, a magnetic hard disk drive adapted for mobility to operatively function in the library system 400, or other hybrid data storage element adapted for mobility to operatively function in the library system 400, for example. Moreover, for simplicity of explanation, the embodiment of FIG. 4 depicts each sub-library 402 and 404 comprising a single drive 410 and 430 and a single robot 412, 432, however, each sub-library can comprise a plurality of drives and robots. The library system 400 of FIG. 4, which is expanded by way of multiple sub-library 402, 404, may be a result of a customer or end user expanding the data storage capacity by way of increasing numbers of tape cartridges 456 in the library system 400. For example, the end user may have consumed the data capacity of the tape cartridges (disposed in the storage locations 414a-414p) in the first sub-library 402, but wishes to expand the storage capacity of the library system 400. Accordingly, the library system 400 may be expanded by operationally connecting the second sub-library 404 (or a third sub-library, and so on) to the original sub-library 402, and operationally connecting the second sub-library 404 to the same host computer 300. The end result is that the host computer 300 identifies the library system 400 as having an extended storage capacity to include additional tape cartridges disposed in storage locations 434a-p, for example.

In a situation where additional sub-libraries are added with available storage capacity, balancing the tasks and operations of each sub-library 402, 404 so as to improve the efficiency of operation of each sub-library 402, 404, can be advantageous. For example, the robot 412 may be commanded to take a tape cartridge from one of the storage locations 414a-414p of the first sub-library 402 and place the tape cartridge in the shuttle 438, which then moves via the bridge 406 to the other sub-library 404, whereupon the robot 432 will grasp the tape cartridge from the shuttle 438 and deposit the tape cartridge 456 into one of the storage locations 434a-434p. A reverse process may be utilized to transfer an empty tape cartridge or a tape cartridge containing a relatively small amount of information from the second sub-library 404 to the first sub-library 402. Certain embodiments contemplate balancing the library system 400 based on usage of tape cartridges or on how important or how frequently the tape cartridges are used. For example, if the first sub-library 402 has a disproportionate number of frequently accessed tape cartridges relative to the second sub-library (perhaps based on the priority of the tape cartridges), then a rebalancing may be in order.

Certain embodiments contemplate rules of priority for shifting tape cartridges from the first sub-library 402 to the second sub-library 404. For example, transferring tape cartridges 456 from one storage location to another storage location, especially from one sub-library 404 to another sub-library 402 is of relatively low importance and urgency when compared with the library activities of moving tape cartridges into and out of the drives 410, 430 (such as for a host during a host initiated move instruction). Therefore, the robots 412, 432 will be utilized to transfer tape cartridges from a first storage location, such as storage location 414a, in the first sub-library 402 to a second storage location, such as storage location 434a, in the second sub-library 404, for example, via the shuttle 438 only when operations of each sub-library 402, 404 are relatively idle or quiet, or when the transfer gains some other sort of urgency.

The host computer 300 and/or the library controllers 408, 428 may issue a command directing the shuttle 438 to move via the transport bridge 406 between sub-libraries 402, 404 upon the occurrence of either (a) when the shuttle 438 is full of tape cartridges and can hold no additional tape cartridges 456, (b) when a predetermined time duration has expired since a first tape cartridge 456 has been placed in the shuttle 438, and (c) when the host computer 300 issues a command that a tape cartridge in the shuttle 438 is the subject of a command to read/write information on that tape cartridge, in which event the tape cartridge is transferred to a drive 410, 430. If a tape cartridge is in the shuttle 438 and the host computer 300 issues a command to read/write information on that tape cartridge, then instead of the shuttle 438 traveling via the bridge 406 to another sub-library and using the drive in that sub-library to read/write the tape cartridge, the robot in the sub-library where the shuttle 438 is stationed at the time of such command may be instructed to move adjacent to the shuttle 438, obtain the tape cartridge that is the subject of the command, and to move that tape cartridge into the drive associated with that sub-library, or to a holding receptacle associated with that sub-library. Preferably, the shuttle 438 automatically transfers, via the bridge 406, whenever at least one of the foregoing conditions exist, however the library controllers 408, 428 may issue an alert such as to the host computer 300 viewable by an operator to prompt the operator to decide whether the transfer of the shuttle 438 should occur. Optionally, the library controllers 408, 248, or other macro controller cooperating with the library system 400, can alert an operator that has input to the library system 400 independent of the host computer 300.

Each of the sub-libraries 402, 404 may be "balanced" by evaluating if there is an imbalance based on a comparison of characteristics of tape cartridges in each sub-library 402 and 404, such as whether there is a disparity in the utilization of the tape cartridges in each sub-library 402 and 404, such as by evaluating the relative numbers of tape cartridges in each sub-library 402/404, the total quantity of information on the tape cartridges in each sub-library 402/404, the relative age of the information contained in the tape cartridges, the relative duration of time spent for the tape cartridges in the sub-libraries 402/404, or the historical frequency of use of the tape cartridges in each sub-library 402/404, for example. When the disparity reaches a certain predetermined threshold (such as for example, the first sub-library 402 is performing 80% of all storage operations for the host 300 and the second sub-library 404 is performing 20% of all storage operations, or more preferably 40% and 60%), then the controllers 408, 428 may automatically commence the transfer of selected tape cartridges from the first sub-library 402 to the second sub-library 404 (or vice versa) by using the shuttle 438 to balance the system 400 to a percentage that better reflects close to 50% usage of each sub-library 402/404 or any other selected definition of a desired balance. Alternatively, when the disparity reaches a certain threshold, the library controllers 408, 428 may send an inquiry to the host computer 300 so that it is viewable by an operator of the host computer 300, or optionally, an operator or technician that has access to the library system 400, which asks the operator whether a command should issue to commence the balancing process. Since a perfect balance of certain factors, such as the total quantity of information, in each sub-library 402, 404 may be impossible or impractical to achieve, the invention further contemplates that the balance is deemed to be accomplished and the balancing operation is deemed complete, when the disparity reaches another preselected threshold, such as less than 2%. In another aspect, the library controllers 408, 428 may prioritize the tape cartridges 456 that are transferred first in the balancing process. For example, those having the largest quantity of information, the oldest, or those that are most frequently used, may be transferred first. Such a priority process of transfer will result in the quickest balancing, the fewest maneuvers of the robots 412, 432, and the least disruption of library operations.

It will be appreciated also from having read a description of other, previously described embodiments of the present invention, that the balancing between the sub-libraries 402, 404 may also include placing the tape cartridges 456 in storage locations within each sub-libraries 402, 404 in accordance an association between the priority rankings of the tape cartridges 456 and the priority rankings of the storage locations in the associated sub-libraries 402/404.

In the embodiment shown in FIG. 4, tape cartridges may be transferred between each sub-library 402, 404 via a so-called bridge 406 or pass-through. An example of such a bridge 406 is the Sky-way utilized in connection with the T-Finity library offered by Spectra Logic Corporation of Boulder, Colo. Certain embodiments contemplate the library system 400 including a magazine shuttle 438 that may translate within and along the bridge 406 from end-to-end thereof. The magazine shuttle 438 may be adapted to contain either a single tape cartridge, but preferably a plurality of tape cartridges. When the magazine shuttle 438 is disposed in the left-hand end of the bridge 406 as depicted in FIG. 4, the shuttle 438 is accessible by the robot 412 of the sub-library 402, and when the shuttle 438 is disposed in the right-hand end of the bridge 406 depicted by the dashed lines, the shuttle 438 is accessible by the robot 432 of the sub-library 404. The shuttle 438 and the bridge 406 function similarly to a cylindrical canister used in drive-through banking in which the canister may contain a check, cash, deposit receipt, or other material transferred between a banking customer at the drive-through and a bank teller located within the bank. The canister shuttles between the drive-through location and the location inside the bank via a tube in which the canister travels by varying the air pressure within the tube. The shuttle 438 and the bridge 406 also function like a subway train that transfers passengers between airport concourses. An example of a suitable shuttle 438 is a tape cartridge magazine 450, depicted in FIG. 5. A commercial example of a tape cartridge magazine is a TeraPack made by Spectra Logic Corporation of Boulder, Colo.

Figure 5:
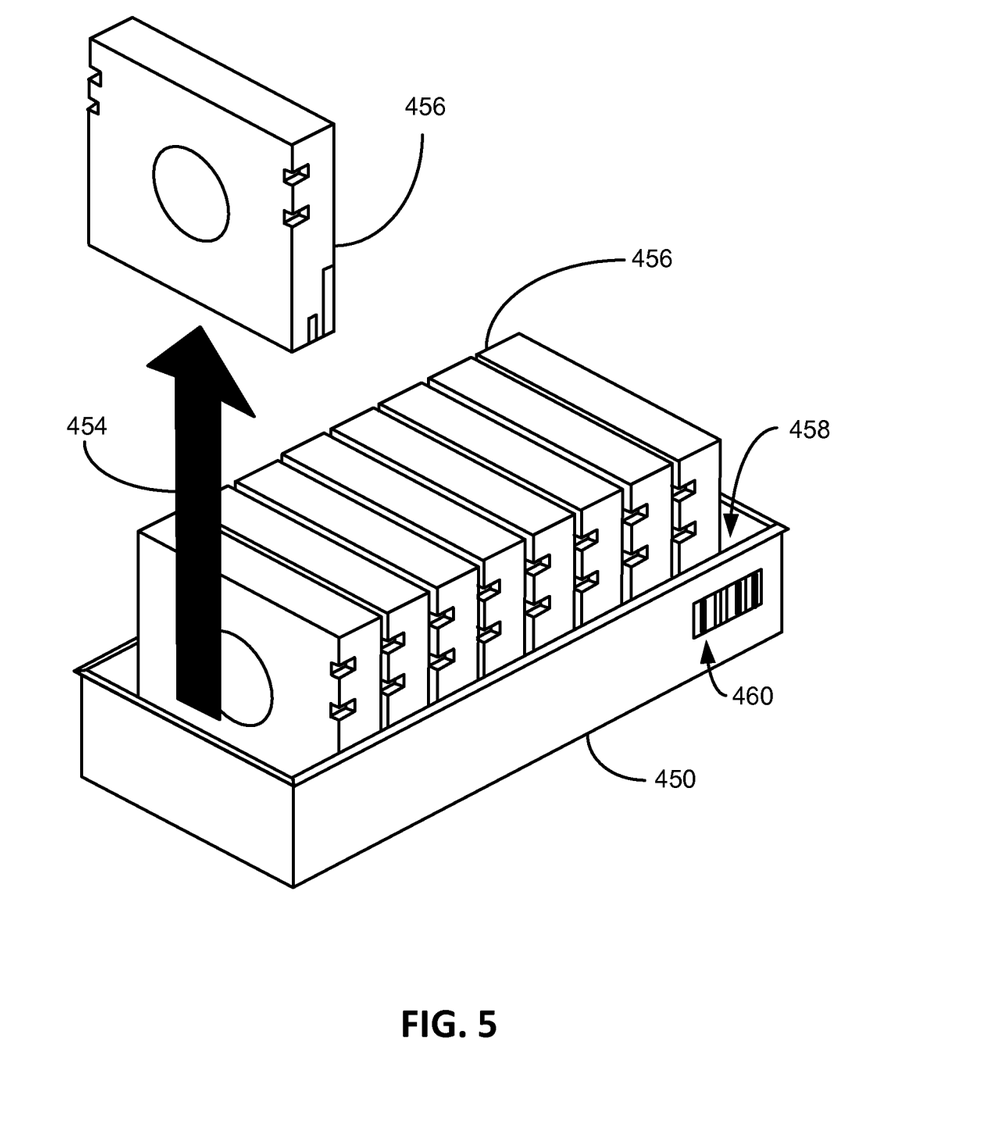
FIG. 5 is a schematic diagram of a plurality of tape cartridges in a magazine that may be utilized with the embodiments of the present invention.

FIG. 5 illustratively depicts an embodiment of a tape cartridge magazine 450. As shown therein, a plurality of tape cartridges 456 are supported by the tape cartridge magazine 450. In more detail, a tape cartridge 456, such as an LTO-3 category tape cartridge, comprises magnetic tape that is capable of storing digital data written by a compatible drive 410, such as an LTO-3 tape drive manufactured by IBM of Armonk, N.Y., when in cooperation to read and write data (i.e., loaded) with the tape cartridge 456. The tape cartridge magazine 450 is illustratively shown populated with a plurality of tape cartridges 456. A tape cartridge 456 can be removed from the tape cartridge magazine 450, as shown by the arrow 454. Disposed on the tape cartridge magazine 450 is a bar code identifier 460 for identifying the tape cartridge magazine 450, which has utility should the tape cartridge magazine 450 be archived in a tape cartridge pack storage vault that is remote from a library (i.e., not in a library), for example. As illustratively shown, the tape cartridge magazine 450 possesses an empty physical slot 458 available to receive another tape cartridge 456.

In the example where the storage capacity of first sub-library 402 is consumed to the extent that more storage capacity is added by way of the second sub-library 404, balancing of resources to improve library efficiency can be accomplished by way of transferring tape cartridges 456 between the first sub-library 402 and the second sub-library 404. For example, prior to adding the second sub-library 404 to the library system 400, the first sub-library 402 may have reached a consumed storage capacity threshold that requires capacity expansion. Certain embodiments contemplate the consumed storage capacity threshold to be a percentage, such as 60% or 70%, of the overall storage capacity of the sub-library 402 being filled with data, hence if 60% of the library's capacity is consumed with data then 40% is still available to store new data. Certain embodiments contemplate a consumed storage capacity threshold to be a predetermined percentage of overall storage capacity of the sub-library 402 set by a user of data, an operator, the original library manufacturer, a seller of the library, etc. Other embodiments contemplate a consumed storage capacity threshold to be a predetermined quantity of data consumed, such as the number of bits stored in the library system 400. Optional embodiments contemplate the addition of one or more sub-libraries to the library system 400 independent of consumed storage capacity, such as if an end user simply wants to increase storage capacity of their library system 400. Once expanded, the second sub-library 404 will most likely possess a significant amount of "free" storage capacity in the form of tape cartridges 456 available for data to be stored thereon. Accordingly, in order to balance use of the resources of the system 400, such as robots 412 and 432 and the drives 410 and 430, certain embodiments contemplate shifting tape cartridges 456 between the first sub-library 402 and the second sub-library 404.

Figure 6:
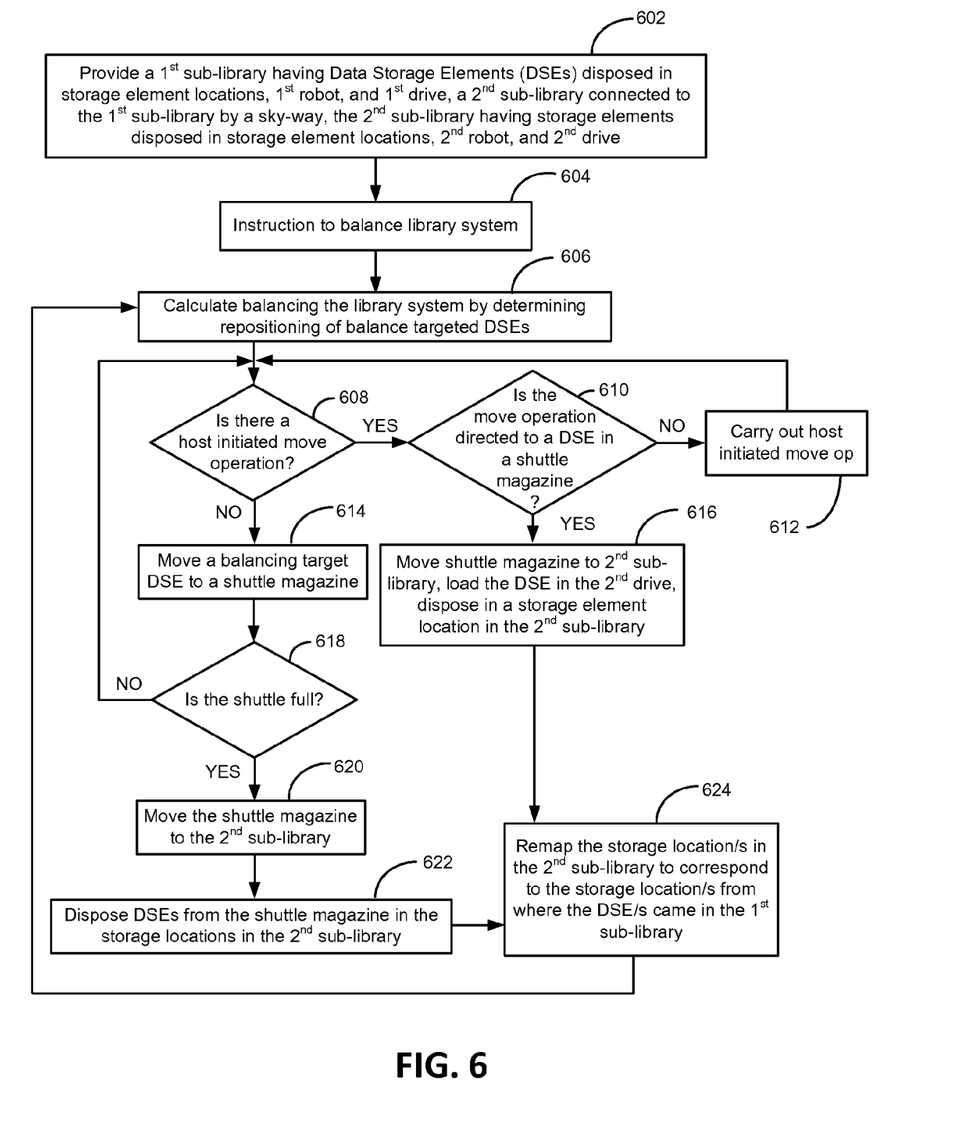
FIG. 6 is a flow diagram of a method consistent with certain embodiments of the present invention.

FIG. 6 illustrates an embodiment of a method for balancing the storage system 400, which in the present embodiment is a tape cartridge library, consistent with embodiments of the present invention. FIG. 6 is described in conjunction with FIG. 4. It should be recognized that the steps presented in the described embodiments of the present invention do not necessarily require any particular sequence unless otherwise stated. With reference to block 602, a library system 400 is provided with a first sub-library 402 connected to a second sub-library 404 via a skyway 406. The first sub-library 402 comprises a plurality of storage tape cartridges 456 locations 414a-p each adapted to hold a tape cartridge 456, at least one robot 412, at least one drive 410 and a first library controller 408. The second sub-library 404 comprises a plurality of storage tape cartridges 456 locations 434a-p each adapted to hold a tape cartridge 456, at least one robot 432, at least one drive 430 and a second library controller 428. Certain embodiments contemplate that the second sub-library 404 is added to the first sub-library 402 when a predetermined consumed storage capacity threshold of the first sub-library 402 is reached (such as 90% storage capacity is used up and the library 400 is running out of available storage space); however, other embodiments contemplate adding a second sub-library 404 for other reasons, such as greater shared resources, for example. In the embodiment where the second sub-library 404 is added to increase storage capacity of the library system 400. The second sub-library 404 comprises new, unused tape cartridges 456, and thus possesses a disproportionate amount of available storage capacity compared with the first sub-library 402.

In step 604, the library system 400 is instructed to balance available storage capacity in the storage system 400 by moving tape cartridges 456 that are essentially filled with data (or at least partially containing data) between the first sub-library 402 and the second sub-library 404 (i.e., balance the number of "full" tape cartridges 456 between the first sub-library 404 and the second sub-library 404). For ease of simplicity, a "full" tape cartridge 456 is one which has user data retained therein and is essentially unable to store significant amounts of new data, if any. In contrast an "empty" tape cartridge 456 is one which essentially has no or a small amount of user data retained therein and is able to store significant amounts of new data. Certain embodiments contemplate instructions to balance the sub-library available storage capacity automatically via the library system 400, via an operator using a Graphic User Interface (GUI) provided with a sub-library 402/404 or on a computer linked to the sub-library 402/404, via the host computer 300, or via the library manufacturer, just to name several examples. Other embodiments contemplate the host computer 300 having no knowledge of any movement of tape cartridges 456 in an effort to balance the library system 400 wherein the balancing occurs in the "background", such as via the controllers 408, 428.

Step 606 involves calculating a strategy to balance the library system 400, e.g., empty tape cartridges 456 and full tape cartridges 456 in the first and second sub-libraries 402 and 404, by repositioning full tape cartridges from the first sub-library 402 to the second sub-library 404 and empty tape cartridges 456 from the second sub-library 404 to the first sub-library 402. Once calculated, the library system 400 is free to commence balancing operations, according to the present embodiment.

In the decision step 608, if the library system 400 receives a host-initiated storage instruction to load a target tape cartridge 456a in a target drive, then the host-initiated storage instruction is prioritized to be performed over any balancing operation. In this embodiment, an end user's need for data retrieval or data storage takes precedence over balancing the library system 400, which can be done in the background, perhaps, without the knowledge of the host 300. If there is one robot, then that one robot will be dedicated to the host-initiated storage instruction. However, certain embodiments contemplate that if there are multiple robots and one (or more) of the multiple robots is under-utilized by the host 300 then that under-utilized robot can continue the balancing process.

In the decision of step 610, if the host-initiated storage instruction is directed to a target tape cartridge 456a disposed in a magazine shuttle 438, then target tape cartridge 456a is moved to the sub-library where it is intended to be disposed for balancing the library system 400 and loaded in a tape drive there, step 616. Hence, if the target tape cartridge 456a is intended to be moved to the second sub-library 404, the magazine shuttle 438 is transported, via the sky-way from the first sub-library 402 to the second sub-library 404 and the target tape cartridge 456a is loaded in the second tape drive 430 via the second robot 432 as a priority. Other embodiments contemplate the target tape cartridge 456a being moved from the magazine shuttle 438 to the nearest available tape drive, hence if the magazine shuttle 438 is still at the first sub-library 402, the target tape cartridge 456a will be moved from the magazine shuttle 438 to the first tape drive 410 via the first robot 412.

After the target tape cartridge 456a has completed storage operations, the target tape cartridge 456a can be moved to a storage location in the second library 434a, and disposed therein and remapped so that the host 300 can access the target tape cartridge 456a without a logical conflict, step 624.

In the decision of step 610, if the host-initiated storage instruction is directed to a target tape cartridge 456a not disposed in the magazine shuttle 438, then target tape cartridge 456a is moved to the target tape drive and loaded therein, as shown in step 612, thus facilitating storage operations to commence on the target tape cartridge 456a. Once the target tape cartridge 456a is loaded in the target tape drive, the robot 412 or 432 is free to continue balancing operations assuming there is not another host-initiated move operation 608, decision step 608.

Assuming there is no host-initiated move operation in decision step 608, the library system 400 is free to balance tape cartridges 456 between the first and second sub-libraries 402 and 404. As shown in step 614, a first balancing target tape cartridge 456b is moved, via the first robot 412, from the first shelf location 414a to the shuttle magazine 438 and disposed therein. As previously mentioned, assuming there is a robot not being utilized by the host, then balancing operations can continue with the robot not being utilized by the host.

Once the first balancing target tape cartridge 456b is disposed in the magazine shuttle 438, the question of whether another balancing target tape cartridge 456c can be disposed in the shuttle magazine 438 is raised, decision step 618. If there is room for another balancing target tape cartridge 456c, the storage system 400 determines if there is a priority host-initiated move operation prior to continuing, as shown by looping back to decision 608. Assuming that there is not another host-initiated move operation, another balancing tape cartridge 456c is moved from the second shelf location 414b to the shuttle magazine 438 and disposed therein. This continues until the shuttle magazine 438 is full, after which then proceed to step 620.

The full shuttle magazine 438 is moved from the first sub-library 402 to the second sub-library 404, via the bridge 406 where the second robot 432 can dispose the balancing tape cartridges 456b, 456c . . . 456n, step 622. Once disposed in the second sub-library 402 the balancing tape cartridges 456b, 456c . . . 456n, are remapped 624. Certain embodiments contemplate checking to see if there is a host-initiated move instruction after each balancing tape cartridges 456b, 456c . . . 456n is disposed in a storage location 434a-434n. If there is, follow steps similar to step 608 wherein the priority is to attend to any host-initiated move instruction over balancing the library system 400. This is repeated with full and empty tape cartridges 456—the empty cartridges travelling in a reverse direction via the bridge 406—until the library system 400 is considered balanced.

Figure 7:
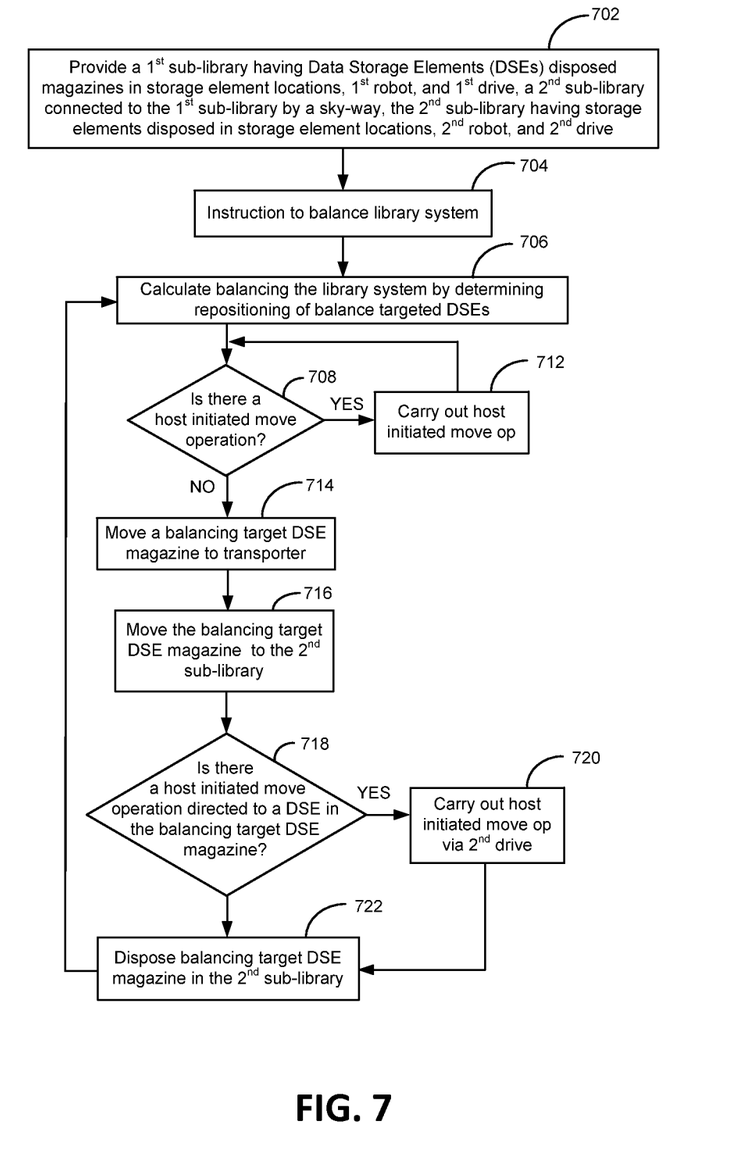
FIG. 7 is an alternative flow diagram of a method consistent with certain embodiments of the present invention.

FIG. 7 contemplates optional embodiments of the present invention directed to a magazine-based data cartridge library such as that illustratively shown in FIG. 4. In this embodiment, the library system 400 is much like that operationally described in FIG. 6, however, instead of each storage location 414a-p/434a-p holding an individual tape cartridge 456, the library system 400 is provided with each storage location 414a-p/434a-p holding a tape cartridge magazine 450 (step 702).

As shown in step 704, the library system 400 is instructed to balance available storage capacity in the storage system 400 by moving tape cartridge magazines 450 with tape cartridges 456 that are essentially filled with data (or at least partially containing data) between the first sub-library 402 and the second sub-library 404 (i.e., balance the number of "full" tape cartridges 456 between the first sub-library 402 and the second sub-library 404). Empty tape cartridges 456 in the second sub-library 404 are moved to the first sub-library 402.

Step 706 involves calculating a strategy to balance magazines 450 with empty and full tape cartridges 456 in the first and second sub-libraries 402 and 404 by repositioning magazines 450 comprising full tape cartridges from the first sub-library 402 to the second sub-library 404. Once calculated, the library system 400 is free to commence balancing operations, according to the present embodiment.

In the decision step 708, if the library system 400 receives a host-initiated storage instruction to load a target tape cartridge 456a in a target drive, then the host initiated storage instruction is prioritized to be performed over any balancing operation. In this embodiment, an end user's need for data retrieval or data storage takes precedence of balancing the library system 400, which, in certain embodiments, can be done in the background without the knowledge of the host 300.

In the decision of step 708, if the host-initiated storage instruction is directed to a target tape cartridge 456a, then target tape cartridge 456a is moved to the target tape drive and loaded therein, as shown in step 712, thus facilitating storage operations to commence on the target tape cartridge 456a. Once the target tape cartridge 456a is loaded in the target tape drive, the robot 412 or 432 is free to continue balancing operations assuming there is not another host-initiated move operation 708, decision step 708.

Assuming there is no host-initiated move operation in decision step 708, the library system 400 is free to balance tape cartridges 456 between the first and second sub-libraries 402 and 404. As shown in step 714, a balancing target tape cartridge magazine 450 is moved, via the first robot 412, from the first shelf location 414a to the sky-way 406.

As shown in step 716, the balancing target tape cartridge magazine 450 is moved from the first sub-library 402 to the second sub-library 404, via the sky-way 406 where the second robot 432 can dispose the balancing target tape cartridge magazine 450, step 622.

Prior to disposing the balancing target tape cartridge magazine 450 in the second sub-library 404, the library system 400 checks for a host-initiated move instruction, step 718. Any host-initiated move instruction takes priority over balancing operations and is performed over balancing operations, step 720. For example, if a host-initiated move instruction is directed to a target tape cartridge 456a from the balancing target tape cartridge magazine 450, then the balancing target tape cartridge magazine 450 is moved near the target tape drive, such as the second tape drive 432 and the target tape cartridge 456a is withdrawn from the balancing target tape cartridge magazine 450 and loaded in the target tape drive 430.

At this point, the balancing target tape cartridge magazine 450 is disposed in a storage location, such as 434a, in the second sub-library 404 where it is remapped 624. This process is repeated with full and empty tape cartridges 456 until the library system 400 is considered balanced.

While exemplary embodiments have been presented in the foregoing description of the invention, it should be appreciated that a vast number of variations within the scope of the invention may exist including other methods of determining probe insertion positioning. The foregoing examples are not intended to limit the nature or the scope of the invention in any way. Rather, the foregoing detailed description provides those skilled in the art with a foundation for implementing other exemplary embodiments of the invention.

I claim:

1. A library system comprising:
    a first sub-library possessing a first set of mobile data storage elements and a first robotic transporter;
    a second sub-library possessing a second set of mobile data storage elements and a second robotic transporter;
    a transport bridge connecting said first sub-library to said second sub-library;
    a computer processor programmed to control a strategy to redistribute a portion of said first set of mobile data storage elements from said first sub-library to said second sub-library, said strategy governed by a priority scheme whereby a host-initiated move instruction that requires use of one of said robotic transporters takes priority over any redistribution of said first portion and temporarily interrupts said redistribution scheme.

2. The library system of claim 1 wherein said computer processor further controls a strategy to redistribute a portion of said second set of mobile data storage elements from said second sub-library to said first sub-library.

3. The library system of claim 2 wherein said host-initiated move instruction that requires use of said second robotic transporter takes priority over any redistribution of said first second portion and temporarily interrupts said redistribution scheme of said second portion.

4. The library system of claim 3 further including a magazine shuttle adapted to hold a plurality of individual mobile data storage elements and adapted to reciprocally translate along said transport bridge wherein said strategy includes using said first robotic transporter to move individual mobile data storage elements from said first set of mobile data storage elements into said magazine shuttle until said magazine shuttle is filled with individual mobile data storage elements.

5. The library system of claim 4 wherein said priority scheme will temporarily interrupt said first robotic transporter from moving said individual mobile data storage elements from said first set of mobile data storage elements into said magazine shuttle when said host-initiated move instruction is received by said library system and until said host-initiated move instruction no longer requires use of said first robotic transporter.

6. The library system of claim 4 wherein, when said host-initiated move instruction is directed to a target mobile data storage element that is disposed in said magazine shuttle, said priority scheme instructs said magazine shuttle to essentially immediately move to said second sub-library via said transport bridge, and to carry out said host-initiated move instruction in said second sub-library.

7. The library system of claim 4 wherein said priority scheme instructs said magazine shuttle to move to said second sub-library via said transport bridge when said magazine shuttle is full.

8. The library system of claim 7 wherein said strategy includes disposing individual mobile data storage elements from said magazine shuttle in accommodating locations in said second sub-library, one at a time.

9. The library system of claim 8 wherein said individual mobile data storage elements in said first set of mobile data storage elements are identified by logical addresses and said strategy includes mapping said accommodating locations in said second sub-library to correspond to said logical addresses.

10. The library system of claim 3 wherein said strategy is initiated when a characteristic of said first set of mobile data storage elements and of said second set of mobile data storage elements becomes imbalanced to a preselected degree, said characteristic selected from the group consisting of the numbers of said mobile data storage elements in each of said first set and said second set, the total quantity of information on said mobile data storage elements in each of said first set and said second set, the relative age of information on said mobile data storage elements in each of said first set and said second set, the relative duration of information on said mobile data storage elements in each of said first set and said second set, and the historical frequency of use of information on said mobile data storage elements in each of said first set and said second set.

11. The library system of claim 1 further comprising a magazine and wherein said first set of mobile data storage elements reside in said magazine and wherein said strategy includes moving said magazine from a first accommodating location in said first sub-library to a second accommodating location in said second sub-library via said transport bridge.

12. The library system of claim 1 wherein said first set and said second set of mobile storage elements are from a group consisting of: a magnetic disk drive adapted and arranged for mobility within said library system, a tape cartridge, and a solid state storage device adapted and arranged for mobility within said library system.

13. A method comprising:
providing a library system that comprises: a first sub-library possessing a first set of mobile data storage elements and a first robotic transporter, a second sub-library possessing a second set of mobile data storage elements and a second robotic transporter, a transport bridge connecting said first sub-library to said second sub-library;
instructing said library system to be balanced;
determining a first portion of said first set of mobile data storage elements to be moved from said first sub-library to said second sub-library and a second portion of said second set of mobile data storage elements to be moved from said second sub-library to said first sub-library;
in response to said instruction and after said determination, moving said first portion of said first set of mobile data storage elements with said first robotic transporter to said transport bridge unless there is a first host-initiated move instruction that requires use of said first robotic transporter, and if there is said first host-initiated move instruction, then implementing said first host-initiated move instruction before commencing or completing said moving step;
transporting said first portion of said first set of mobile data storage elements from said first sub-library to said second sub-library via said transport bridge;
disposing said first portion of mobile data storage elements in said second sub-library.

14. The method of claim 13 wherein said library system includes a transport magazine shuttle adapted to hold a plurality of mobile data storage elements, said method further comprising disposing said first portion of said first set of said mobile data storage elements in a transport magazine shuttle, one mobile data storage element at a time.

15. The method of claim 14 further comprising logically mapping new locations in said second sub-library to correspond to an identification of each of said first set of mobile data storage elements after being disposed in said new locations in said second sub-library.

16. The method of claim 14 wherein if said first portion of said mobile data storage elements is being moved via said first robotic transporter until there is a first host-initiated move instruction that requires use of said first robotic transporter, then said first portion of said mobile data storage elements are moved via a different available robotic transporter comprised by said first sub-library.

17. The method of claim 14 further comprising, if said first host-initiated move instruction is directed to one of said mobile data storage elements in said magazine shuttle prior to said transporting step, then immediately initiating said transporting step to transport immediately said magazine shuttle to said second sub-library and thereafter immediately implementing said first host-initiated move instruction via said second robotic transporter.

18. The method of claim 13 wherein said library system further comprises at least one magazine adapted to hold a plurality of mobile data storage elements and wherein said first portion of said first set of mobile data storage elements is disposed in said at least one magazine, and wherein said first portion of said first set of mobile data storage elements is transported in said at least one magazine from said first sub-library to said second sub-library via said transport bridge.

19. The method of claim 13 wherein said balancing instruction is initiated automatically based on a predetermined threshold of imbalance between said first set of mobile data storage elements and said second set of mobile data storage elements.

20. The method of claim 19 wherein said imbalance is based on a comparison of a characteristic of said first set of mobile data storage elements and said second set of mobile data storage elements, said characteristic selected from the group consisting of the numbers of said mobile data storage elements in each of said first set and said second set, the total quantity of information on said mobile data storage elements in each of said first set and said second set, the relative age of information on said mobile data storage elements in each of said first set and said second set, the relative duration of information on said mobile data storage elements in each of said first set and said second set, and the historical frequency of use of information on said mobile data storage elements in each of said first set and said second set.

21. The method of claim 13 disposing said first portion of mobile data storage elements in said second sub-library unless said library system receives a second host-initiated move instruction that requires use of said second robotic transporter, and if there is said second host-initiated move instruction, then implementing said second host-initiated move instruction before commencing or completing said disposing step.

22. The method of claim 21 wherein said library system further comprises a magazine shuttle adapted to accommodate a plurality of said mobile data storage elements, and wherein said moving step includes the following sequence of acts in the recited order:
a) during said moving step, moving a first mobile data storage element of said first portion of said first set of mobile data storage elements from a first physical location to said magazine shuttle via said first robotic transporter;
b) disposing said first data storage element in said magazine shuttle;

c) determining if said first host-initiated move instruction occurs, and if so, implementing said first host-initiated move instruction;

d) moving a second mobile data storage element of said first portion of said first set of mobile data storage elements from a second physical location to said magazine shuttle via said first robotic transporter;

e) disposing said second data storage element in said magazine shuttle;

f) determining if said first host-initiated move instruction occurs, and if so, implementing said first host-initiated move instruction;

g) moving a third mobile data storage element of said first portion of said first set of mobile data storage elements from a third physical location to said magazine shuttle via said first robotic transporter; and h) disposing said third data storage element in said magazine shuttle;

and wherein said disposing step includes the following acts:

(a) disposing said first, said second, and said third mobile data storage elements in fourth, fifth and sixth physical locations in said second sub-library, respectively; and (b) remapping said fourth, said fifth and said sixth physical locations to logically correspond to said first, said second and said third physical locations.

23. A method for balancing a library system, the method comprising:

providing a library system comprising a first sub-library and a second sub-library connected by a transport bridge;

initiating a balancing scheme comprising:

moving a first set of mobile data storage elements from said first sub-library via a first robotic transporter to said transport bridge;

transporting said first set of mobile data storage elements to said second sub-library via said transport bridge;

disposing said first set of mobile data storage elements in said second sub-library via a second robotic transporter; and temporarily interrupting said balancing scheme if said library system receives a first host-initiated move instruction directed to a first target mobile data storage element requiring the use of said first robotic transporter during said moving step or if said library system receives a second host-initiated move instruction directed to a second target mobile data storage element requiring the use of said second robotic transporter during said disposing step.

24. The method of claim 23 wherein said balancing scheme is automatically initiated if there is an imbalance in data storage operations between said first sub-library and said second sub-library above a predetermined threshold.

25. A method comprising:

providing a library system comprising a first sub-library and a second sub-library connected by a transport bridge;

moving a first set of mobile data storage elements from said first sub-library via a first robotic transporter to said transport bridge;

transporting said first set of mobile data storage elements to said second sub-library via said transport bridge;

disposing said first set of mobile data storage elements in said second sub-library via a second robotic transporter;

temporarily interrupting said moving step if said library system receives a first host-initiated move instruction directed to a first target mobile data storage element requiring the use of said first robotic transporter in said first sub-library or temporarily interrupting said disposing step if said library system receives a second host-initiated move instruction directed to a second target mobile data storage element requiring the use of said second robotic transporter in said second sub-library.

26. A method of improving the efficiency of an automated data storage library, wherein said library includes (a) a plurality of tape cartridges; (b) at least two sub-libraries each including a plurality of storage locations in which tape cartridge may be disposed for storage, at least one drive for reading information from or writing information onto one of said tape cartridge operationally coupled thereto, at least one translatable robot adapted to move said tape cartridge between said storage locations and said drive or between storage locations, (c) at least one host computer operatively connected to each of said at least one drive and to each of said at least one robot, (d) a bridge extending between and communicating with each said sub-library such that said tape cartridges may be exchanged between each said sub-library, and (e) at least one shuttle adapted to move within said bridge and to transport said tape cartridge between each said sub-library, each of said at least one shuttle being adapted to hold at least one of said tape cartridges, said method comprising:

evaluating whether there is a disparity in the utilization of said tape cartridges between at least two of said sub-libraries, said utilization selected from the group consisting of substantially the numbers of said tape cartridges in each of said at least two sub-libraries, substantially the quantity of information on each of said tape cartridges in each of said at least two sub-libraries, substantially the age of information contained in each of said tape cartridges in each of said at least two sub-libraries, substantially the duration of each of said tape cartridges in each of said at least two sub-libraries, and substantially the historical frequency that each of said tape cartridges has been operatively coupled to said at least one drive included in each of said at least two sub-libraries;

decreasing said disparity by:

using said at least one robot of one of said sub-libraries to place at least one of said tape cartridges in said at least one shuttle; and delaying the transport of said at least one tape cartridge placed in said at least one shuttle until the occurrence of a condition selected from the group consisting of (a) said at least one shuttle is full of said tape cartridges and can hold no additional tape cartridges, (b) a preselected time duration has expired, and (c) upon said at least one host computer issuing a command to move one of said tape cartridges placed in said at least one shuttle to said at least one tape drive in another of said sub-libraries.

27. The method of improving the efficiency of an automated tape cartridge storage library according to claim 26 wherein said disparity is decreased automatically when said disparity attains a predetermined threshold.

28. A method of improving the efficiency of an automated data storage library, wherein said library includes (a) a plurality of tape cartridges; (b) at least two sub-libraries each including a plurality of storage locations in which said tape cartridges may be disposed for storage, at least one drive for reading information from or writing information onto one of said tape cartridges operationally coupled thereto, at least one translatable robot adapted to move said tape cartridges between said storage locations and said drive or between said storage locations, (c) at least one host computer operatively connected to each of said at least one drive and to each of said at least one robot, (d) a bridge extending between and communicating with each said sub-library such that said tape cartridges may be exchanged between each said sub-library, and (e) at least one shuttle adapted to move within said bridge and to transport said tape cartridges between each said sub-library, each of said at least one shuttle being adapted to hold at least one of said tape cartridges, said method comprising:

using said at least one robot of one of said sub-libraries to place at least one of said tape cartridges in said at least one shuttle; and     delaying the transport of said at least one tape cartridges placed in said at least one shuttle until the occurrence of a condition selected from the group consisting of (a) said at least one shuttle is full of said tape cartridges and can hold no additional tape cartridges, (b) a preselected time duration has expired, and (c) upon said at least one host computer issuing a command to move one of said tape cartridges placed in said at least one shuttle to said at least one tape drive in another of said sub-libraries.

29. The method of improving the efficiency of an automated tape cartridges storage library according to claim 28 wherein said preselected time duration is measured substantially from when a first one of said tape cartridges is initially placed in said at least one shuttle.

30. The method of improving the efficiency of an automated tape cartridges storage library according to claim 29 wherein said library includes a plurality of shuttles.

\* \* \* \* \*